United States Patent [19]

Feiner et al.

[11] 3,951,248

[45] Apr. 20, 1976

[54] TELEPHONE LINE VISUAL STATUS INDICATION CIRCUIT

[75] Inventors: Alexander Feiner; Dennis Bryan James, both of Rumson; James Royce McEowen, Holmdel Township, Monmouth County, all of N.J.

[73] Assignee: Bell Telephone Laboratories, Incorporated, Murray Hill, N.J.

[22] Filed: Nov. 7, 1974

[21] Appl. No.: 521,577

[52] U.S. Cl. .............................. 179/81 C; 179/175
[51] Int. Cl.² ........................................ H04M 3/22
[58] Field of Search ............. 179/81 C, 81 R, 84 L, 179/84 C, 175, 175.3 R, 18 AB; 340/248 B; 324/133

[56] References Cited
UNITED STATES PATENTS

| | | | |
|---|---|---|---|
| 3,374,317 | 3/1968 | Chapin | 179/81 C |
| 3,729,597 | 4/1973 | Garrett | 179/175.3 R |
| 3,801,974 | 4/1974 | Aitken | 179/81 C |

Primary Examiner—Kathleen H. Claffy
Assistant Examiner—Joseph Popek
Attorney, Agent, or Firm—David H. Tannenbaum

[57] ABSTRACT

In telephone installations it is often necessary to know, without actually physically going off-hook, the status of the line. A solution to this problem is presented by the design of a low drain line status indicator circuit. Advantage is taken of the fact that the idle line voltage available from the switching machine is significantly greater than the busy line voltage. Accordingly, when the line is idle, a pulsating voltage is developed which is used to flash a light source at the station. When the line is busy or on hold, which situation can occur from a telephone station set connected to a remote extension, the line voltage is insufficient to enable the pulsating voltage circuit and, thus, the light source remains dark. In situations where one telephone station set serves two lines, the light sources associated with each line at each station location are arranged to flash in synchronism.

19 Claims, 5 Drawing Figures

FIG. 3
| ELEMENT | VALUE |
|---|---|
| R10 | 75Ω |
| R11 | 390Ω |
| R12 | 620KΩ |
| R13 | 75Ω |
| R14 | 390Ω |
| R15 | 620KΩ |
| R16 | 10KΩ |
| R17 | 1MΩ |
| R18 | 1MΩ |
| C1 | 2μf |
| C2 | 5μf |
| C3 | 2μf |
| C4 | 5μf |
| C5 | 5pf |
| C6 | 5pf |
| C7 | 1μf |
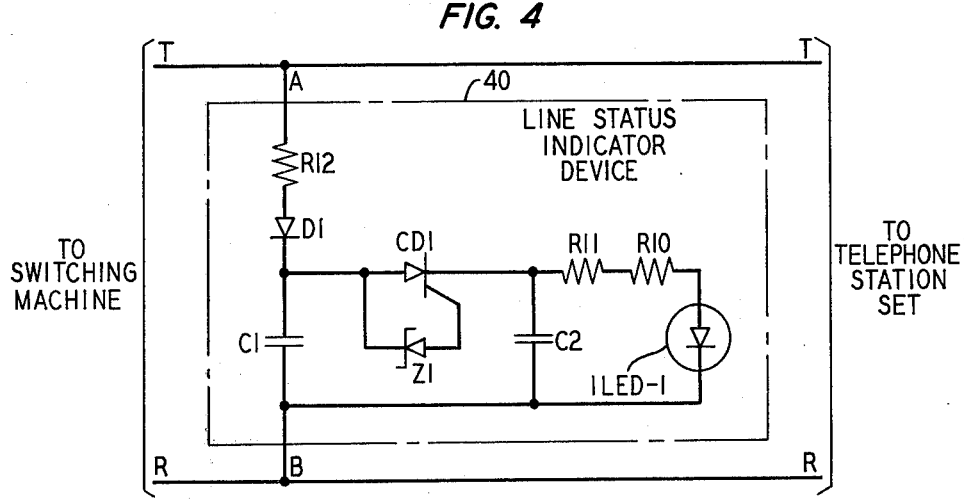
FIG. 4
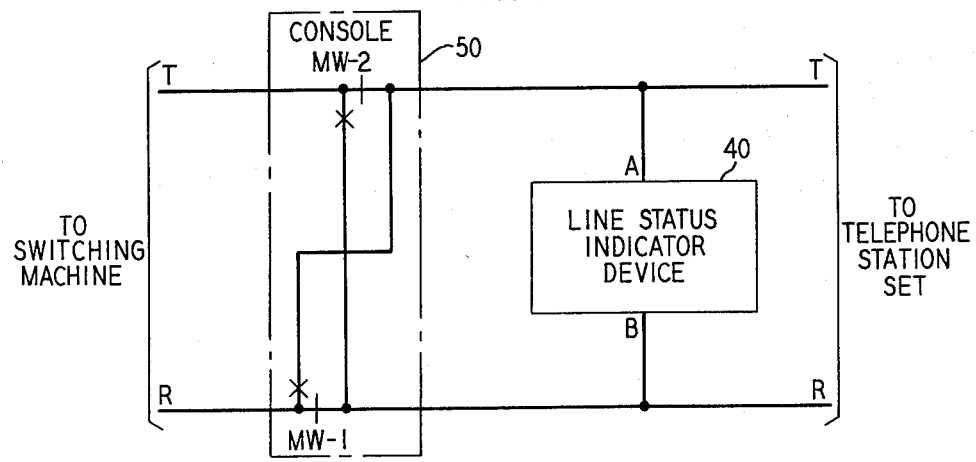
FIG. 5

TELEPHONE LINE VISUAL STATUS INDICATION CIRCUIT

FIELD OF THE INVENTION

This invention relates to telephone systems and, more particularly, to an arrangement for determining the status of a telephone line.

BACKGROUND OF THE INVENTION

In many situations it is necessary to determine the busy-idle status of a telephone line without actually connecting the telephone network across the line. For example, in a situation where a number of telephone lines end in jack connections it is sometimes advantageous to plug the telephone, or other communication equipment, into a jack associated with a known idle line without first audibly sampling each line to determine which line is idle.

Although the solution to the problem, namely, placing a light indicator device across the communication leads, at first appears straightforward, there are many complicating factors which must be taken into account. Of foremost concern when designing a line monitoring device is the fact that the current drain of the device must be low enough so that the switching machine does not falsely detect an off-hook condition. Also, the current drain must be sufficiently low so that any line test equipment placed on the line will not indicate a fault condition.

As an indication of the need for a telephone line status indicating device, the multiple extension home telephone system is a typical example. Since more than one telephone station set may become connected to the same telephone line, it often happens that while one person is communicating from one telephone station set a second person at a second station set, thinking the line is idle, lifts the receiver of the second station set and becomes bridged across the established connection. This is an undesirable situation and one that can be avoided if there is provided at each telephone station set location a visual indication of the status of the associated line.

In situations where it is possible to add additional wiring to telephone installations, U.S. Pat. No. 3,906,168, issued Sept. 16, 1975 to J. R. McEowen, and entitled "Visual Status Indicator Circuit" teaches one possible solution. However, in existing installations it is usually uneconomical to add additional wires between the telephone locations. Thus, a need exists in the art for an economical system of indicating to a subscriber at one telephone station set location the busy-idle status of the associated telephone line in situations where that telephone line is connectable to telephone station sets at different locations without necessitating the use of wires other than those which exist for communication purposes, and without excessive current drain from the switching machine.

SUMMARY OF THE INVENTION

We have designed a small telephone system which meets this and other objectives, and which allows a subscriber at one telephone station set location to determine visually the operational status of a multistation telephone line. Such a visual indication system may be used both in the single line multistation application described above or it can be used in multiline situations where one or more stations are connectable to the different telephone lines. Our invention takes advantage of the fact that the idle line voltage available on the telephone line from the switching machine, such as a central office or a PBX, is significantly greater than the busy line voltage. Accordingly, when the line is idle, a first capacitor in an applique circuit associated with each line termination is charged to a level which causes a voltage breakdown device to conduct, thereby charging a second capacitor which in turn flashes a light emitting diode (LED) at the applique unit. When the line is busy or on hold, which situation can occur from a telephone station set connected to a remote extension, the line voltage from the central switching machine is insufficient to cause the voltage breakdown device to conduct and thus the light emitting device remains dark. In situations where one telephone station set serves two lines, the idle line visual indicators of each applique unit can be arranged to flash in synchronism with each other by capacitively cross-coupling the circuits.

The idle line indicator circuit can be used to detect communication line reversals. Taking advantage of this aspect, it is possible to arrange a hotel-motel message-waiting system where the visual indicator at each station set only flashes when the switchboard attendant operates a switch to reverse the communication leads. The advantages of such an arrangement are that the existing wiring of the hotel-motel need not be changed and that no additional power is required.

Accordingly, it is one feature of our invention that at each termination of a telephone line there is provided a device for visually indicating in a positive manner the idle status of the line, such device operable exclusively from potentials present on the telephone line from the switching machine.

It is a further feature of our invention that when two different lines terminate at the same physical locations the visual indicators of each line are cross-coupled so that they operate synchronously with each other.

It is a still further feature of our invention to arrange a visual indication device across the communication leads of a telephone line in a manner to detect voltage polarity reversals of the communication line.

BRIEF DESCRIPTION OF THE DRAWING

The operation and utilization of the present invention will be more fully apparent from the following description of the drawing, in which:

FIG. 3 is a chart showing typical values for the various elements;

FIG. 4 is a schematic drawing showing a simplified version of the line status indicator device of the invention; and FIG. 5 shows the line status indicator device of the invention used in a message-waiting environment.

DETAILED DESCRIPTION

Figure 1:
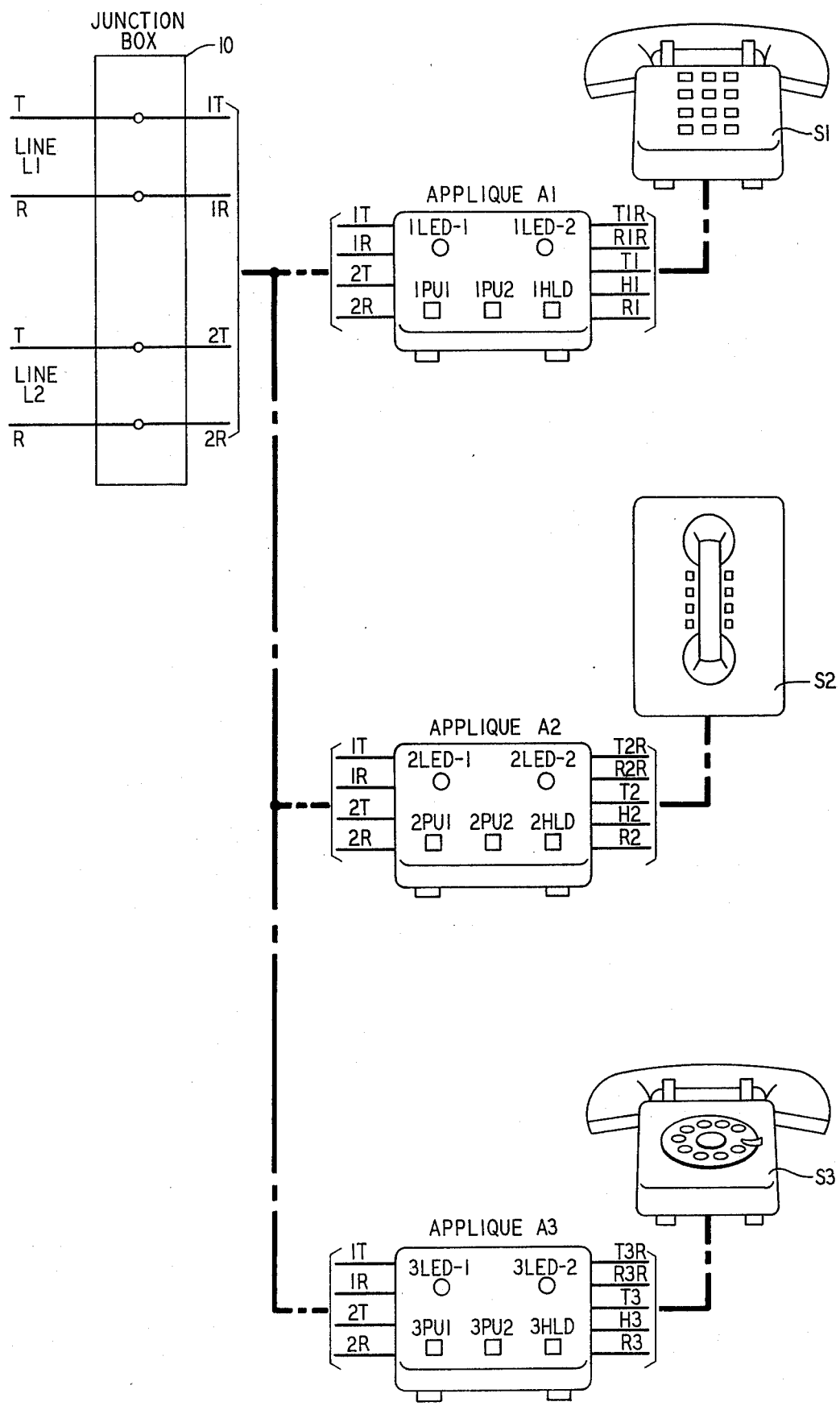
FIG. 1 shows in pictorial format three telephone stations connected to two central office lines.

In FIG. 1 there is shown a multiline, multistation system having applique units, A1, A2 and A3, each associated with a particular one of the telephone station sets S1, S2 or S3. There is also shown two communication pairs of lines, L1 and L2, extending directly to a central office or PBX switching network. These lines are each extended through junction box 10 to the applique unit associated with each station set. Each of the applique units is equipped with a pickup key, such as pickup key 1PU1, for each line connected thereto. Thus, since applique unit A1 is associated with both lines L1 and L2, two pickup keys, namely, keys 1PU1 and 1PU2, are associated therewith. Also associated with each line at each applique unit is a light emitting device, such as a light emitting diode (LED). Accordingly, applique unit A1 has associated therewith light emitting diodes 1LED-1 and 1LED-2. In situations where only one line is used, the applique unit would be arranged with only a single light source. Such an applique unit would not necessarily have a pickup key since there then would be no need to switch between lines.

For situations where the hold feature is desired, each applique unit would also have a hold key, such as hold key 1HLD. It should be noted that in the arrangement shown the pickup keys are locking type keys while the hold keys are of the nonlocking type. However, although the pickup keys are of the locking type, one contact, such as 1PU1-4, of each pickup key is arranged in a nonlocking manner so that when the key is depressed all of the key contacts close. However, the nonlocking contact of the depressed key only remains closed while pressure remains on the key and as soon as the pressure is removed the nonlocking contact opens, while the remainder of the key contacts stay closed. The importance of such an arrangement will be more fully appreciated from that which is to follow. Also note that the pickup keys and the hold keys at each applique unit are mechanically interconnected such that the operation of any key acts to release any other operated key.

Figure 2:
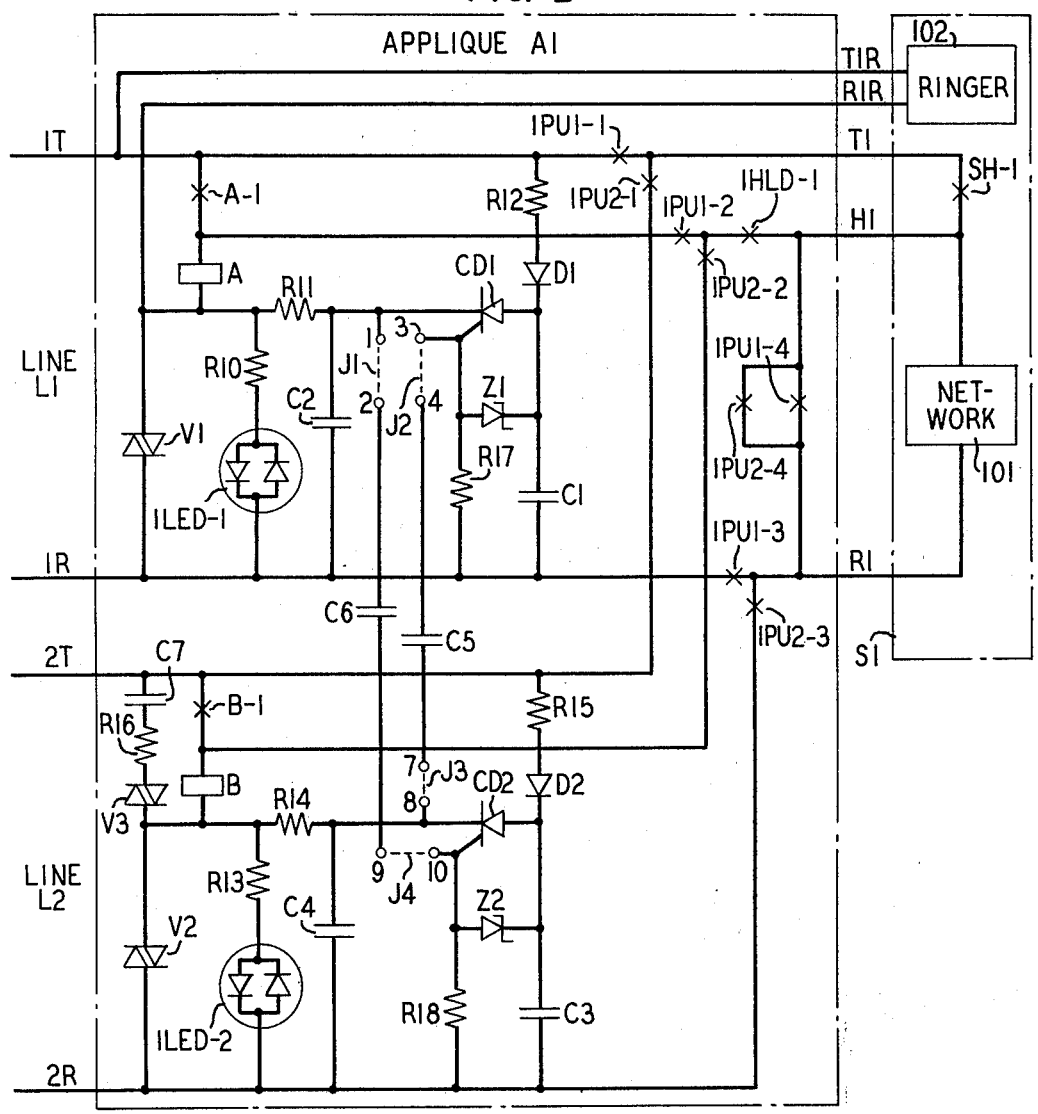
FIG. 2 is a schematic drawing showing in greater detail the circuitry of the invention.
Figure 2:
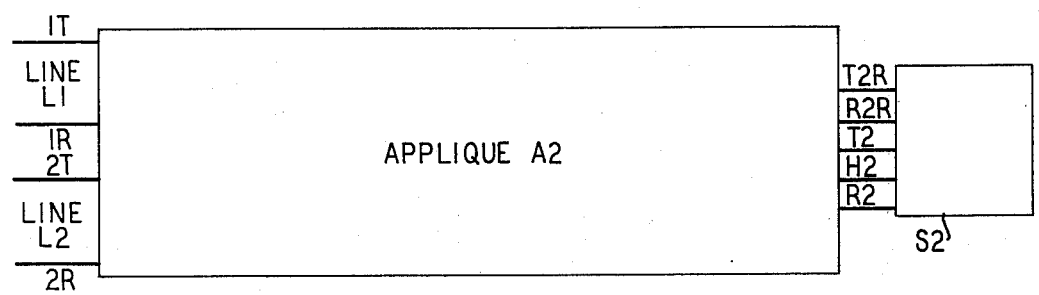
Figure 2:
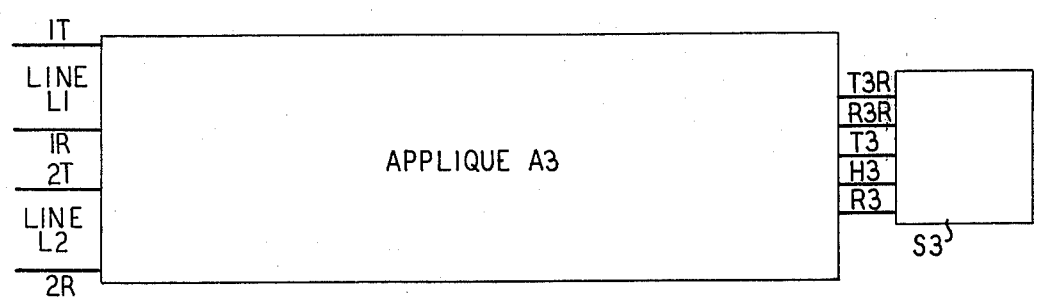

Turn now to FIG. 2 and assume that both lines L1 and L2 are idle. Under such a condition the light emitting devices, such as 1LED-1 associated with line L1 and 1LED-2 associated with line L2, flash, signifying that the respective lines are, in fact, idle. This operation will now be detailed with respect to line L1 and applique A1.

The idle line voltage across the 1T and 1R leads of line L1 is at approximately 48 volts when line L1 is idle. The 48-volt potential is supplied in a conventional manner from the switching machine with negative potential on lead 1R and positive potential on lead 1T. This voltage serves to charge capacitor C1 slowly via resistor R12 and diode D1. Resistor R12 is selected so that only approximately 50 micro amps of current flow from the communication leads to capacitor C1. After approximately one second, the charge across capacitor C1 reaches 30 volts, causing zener diode Z1 to break down thereby supplying voltage to the gate lead of thyristor CD1, which thyristor is a three-terminal PNPN device having its anode connected to capacitor C1 and its cathode connected to capacitor C2. Thyristor CD1, which in conjunction with zener diode Z1 acts as a voltage breakdown device having a breakdown voltage value and a lower sustaining voltage value, thereupon conducts causing approximately five-sevenths of capacitor C1's charge to be supplied to capacitor C2, thereby charging capacitor C2. When capacitor C2 charges to approximately 8 volts, the voltage across thyristor CD1 drops below its sustaining voltage level and, thus, the thyristor turns off.

The 8-volt potential across capacitor C2 discharges through resistors R11 and R10, causing current to flow through light emitting diode 1LED-1, thereby turning that LED on. The visual device associated with line L1 remains on until the voltage across capacitor C2 is reduced to approximately 2 volts, at which time the LED again goes off.

When thryistor CD1 stops conducting, capacitor C1 again starts to charge, thereby generating a pulsating voltage with respect to the voltage across capacitor C2. This pulsating voltage continues so that light emitting diode 1LED-1 flashes briefly at approximately one second intervals due to the charging of capacitors C1 and C2 and the periodic conducting and nonconducting of thyristor CD1. The visual line indicator 1LED-2 associated with line L2 also periodically flashes when line L2 is idle. The idle line indicator circuit associated with line L2 operates in the same manner as does the previously described idle line indicator circuit associated with line L1. Thus, when line L2 is idle, a small current flows from −48 volts on lead 2R between the 2T and 2R leads of line L2 through resistor R15 and forward-biased diode D2, to charge capacitor C3. When the charge across capacitor C3 reaches 30 volts, the zener diode breaks down causing thyristor CD2 to conduct thereby charging capacitor C4. When capacitor C4 charges to approximately 8 volts, the voltage across thyristor CD2 drops below its sustaining voltage level and, thus, thyristor CD2 turns off.

The 8-volt potential across capacitor C4 discharges through resistors R14 and R13 causing current to flow through light emitting diode 1LED-2, thereby turning that LED on. The LED remains on until the voltage across capacitor C4 is reduced to approximately 2 volts, at which time the LED again goes off.

When thyristor CD2 stops conducting, capacitor C3 again starts to charge thereby generating a pulsating voltage with respect to the voltage across capacitor C4. This pulsating voltage continues so that light emitting diode 1LED-2 flashes briefly at approximately one second intervals due to the charging of capacitors C3 and C4 and the periodic conducting and nonconducting of thyristor CD2. Thus, when both lines L1 and L2 are idle, both LED devices at applique unit A1 visually turn on and off periodically.

Synchronism of Flash Rates Between Lines

Since the precise turn-on time and turn-off time of each LED is controlled by the charge rate of the respective capacitors and the precise breakdown voltage of the respective zener diodes, the flash rates of each LED are random with respect to each other. This random flashing could cause confusion at a telephone station where each line is flashing at a different rate. To remedy this situation, capacitors C5 and C6, which capacitors have a small capacitance value, are utilized to cross-couple the two lines at each applique unit. Under such a condition, jumpers J1, J2, J3 and J4 are used to connect these capacitors into the circuit. Synchronism is achieved when both lines are idle since, under such a condition, a small signal pulse is supplied from capacitor C2 via capacitor C6 to the gate of thyristor CD2. Thus, when thyristor CD1 begins to conduct under control of zener diode Z1, a current pulse is provided to trigger thyristor CD2, which thyristor will only conduct if line L2 is idle since only under such a condition will the voltage across the zener diode be sufficient to permit breakdown of the thyristor. Capacitors C5 and C6 are selected with small values to avoid audible cross-coupling between the lines and so that only small signals are supplied to the other circuit in order that the other line light emitting device remains off when that other line is busy even though a signal is provided via the cross-coupled capacitor.

Busy Line Indications

Assume now that line L1 becomes busy. Under such a condition network 101 at station S1, or any other station, is connected across leads 1T and 1R of line L1 via enabled pickup key contacts 1PU1-1 and 1PU1-3. Under such a condition, the voltage between leads 1T and 1R of line L1 drops below 30 volts. Accordingly, capacitor C1 now cannot charge above the value of 30 volts and, accordingly, zener diode Z1 cannot conduct. Thus, the LED associated with line L1 remains off. It is important to understand that the voltage across line L1 drops below 30 volts when any of the stations are connected across line L1 and, thus, even if the network (not shown) associated with station S2 is connected to line L1 via applique unit A2, the voltage across leads 1T and 1R of line L1 at all of the applique units would be reduced below 30 volts, thereby rendering the visual indication devices of line L1 at all of the applique units dark.

If any station set associated with line L1 goes into the hold condition, the line voltage of line L1 remains below 30 volts and, thus, all of the line L1 visual indication devices at all of the applique units remain dark except for the visual device of the applique associated with the station location which placed the connection on hold, which visual device turns on in a steady manner. Accordingly, the busy-idle status of each line is visually determinable at each station location without interconnecting the locations and without a central control circuit. In addition, all power for operation is supplied from the central switching machine.

Hold Control

The pickup and hold keys are mechanically interlocked with each other such that when the hold key is depressed, the contacts of that key close, but the currently selected pickup key remains operated. When the hold key is released, any operated pickup key releases concurrently.

Continuing now in FIG. 2, the hold circuit operation will now be detailed using the assumption that station S1 is communicating over line L1. Thus, pickup key 1PU1 is operated in applique A1 connecting network 101 of station S1 via switchhook contact SH-1 and leads T1 and R1, through applique unit A1 and enabled pickup key contacts 1PU1-1 and 1PU1-3 to leads 1T and 1R of line L1. At this point, operation of the hold key causes relay A to operate via the potential on lead 1T of line L1, enabled pickup key contact 1PU1-1, enabled switchhook contact SH-1, now enabled hold key contact 1HLD-1, enabled pickup key contact 1PU1-2, through the winding of the A relay through resistor R10 and light emitting device 1LED-1 to the 1R lead of line L1. Since 1LED-1 is in series with the A relay winding, the LED operates concurrently with the operation of relay A. The A relay holds operated via enabled make contact A-1. Removing pressure from the hold key causes all of the pickup key contacts to release, thereby removing network 101 from the connection. However, current continues to flow from central office line L1 through the coil of relay A and through light emitting diode 1LED-1, maintaining the voltage on line L1 below 30 volts. Thus, station S1 is on hold with respect to line L1 and the visual indication device 1LED-1 associated with line L1 in applique unit A1 is on in a steady manner as a visual indication to the subscriber that the line is on hold.

However, the visual indication devices (not shown) with respect to line L1 at applique units A2 and A3 remain off since, as discussed above, the voltage across line L1 at each applique unit is below 30 volts and the respective voltage breakdown circuits in each applique unit maintain the visual devices associated therewith in an off condition.

When station S1, or any other station, desires to become reconnected to line L1, the pickup key associated with line L1 is depressed. Thus, a short circuit is momentarily placed across the winding of relay A to release that relay. This short circuit consists of a path which extends from lead 1T of line L1 via now enabled pickup key contact 1PU1-1, switchhook contact SH-1, enabled pickup key contact 1PU1-4, enabled pickup key contact 1PU1-3 to lead 1R of line L1. Thus, relay A releases at this point. Network 101 of station S1 is also shorted at this time via lead H1, enabled pickup key contact 1PU1-4 and lead R1. However, as was discussed earlier, when operating pressure is removed from the pickup key, contact 1PU1-4 opens and thus network 101 is connected over leads T1 and R1 via enabled pickup key contacts 1PU1-1 and 1PU1-3 to leads 1T and 1R of line L1. At this point communication is again possible over the communication leads of line L1. Since contact 1PU1-4 acts to short across network 101, pressure on the pickup key can be used to remove temporarily the network from the communication path for privacy purposes.

Of course, it will be obvious that, since the hold relay is held operated by line current from the central switching machine, the hold relay will release when current is interrupted momentarily at the central office. When such a situation occurs, the central office voltage will rise to 48 volts and the visual indication device associated with the line at each location will again flash in a periodic manner.

Ringing Indication

Central office ringing signals can be utilized to cause a line LED to flutter. Two methods of accomplishing this are shown in FIG. 2. On line L1, the set's internal ringer 102 is connected between lead 1T and the junction of resistors R10 and R11. The internal ringer normally contains a series capacitor to block DC current while allowing the passage of the 20Hz, 90VAC ringing potential from the central office. Thus, when ringing potential appears across leads 1T and 1R, 20Hz AC current flows through ringer 102, resistor R10 and light emitting diode 1LED-1, causing the LED to light in a fluttering manner at a 40-pulse-per-second rate. On line L2 in FIG. 2, a series resistor-capacitor combination R16 and C7 is used in a similar manner between lead 2T and the junction of resistors R13 and R14 to cause light emitting diode 1LED-2 to respond in a fluttering fashion to ringing potential applied from the central office across leads 2T and 2R. Thus, a visual indication of ringing can be provided for each line at each station, using the same LED which functions to indicate the busy, idle, and held states of the line. It should be noted that if a 20-pulse-per-second flash rate is desired, the LED should not be bipolar as shown in FIG. 2 but rather should be a one direction device, as shown in FIG. 4.

Simplified Line Status Indicator Circuit

In FIG. 4 there is shown a simplified line status indicator device 40. For simplification, the various elements of the device are labeled with the same designations as the corresponding elements shown in FIG. 2. The values of these elements, as shown in FIG. 3, are also the same and, of course, resistors R10 and R11 can be combined into a single resistor. Line status indicator device 40 can be used whenever it is desired to know the busy-idle status of a single telephone communication line. The device can either be housed in a separate unit or it can be mounted inside the telephone station.

Message-Waiting Signal

Line status indicator device 40 can also be used in situations such as hotel-motel environments where it is desired to provide a signal that a message is waiting. The addition of a message-waiting switch, such as switch MW, as shown in FIG. 5, is all that is necessary to convert busy-idle indicator device 40 to a message-waiting device. Under such a situation, the switch MW is ideally located at the hotel-motel switchboard or at the front desk. When a message is waiting the attendant operates the switch, thereby reversing the communication leads.

As discussed previously, when the communication line from the switching machine is idle, the negative potential present on the R lead causes capacitor C1 to charge to a value sufficient to cause the voltage breakdown circuit to conduct current. However, when switch MW is operated, diode D1 in the line status indicator device (as shown in FIG. 4) is back biased from the negative potential supplied via lead R, because the communication pair of leads are reversed, and the LED remains off even though the communication line is idle. When a message is waiting the attendant releases the MW switch, thereby allowing the LED to pulsate, in the manner discussed above, from the idle line voltage available over the communication leads. In such an environment, the pulsating LED signifies that a message is waiting.

It should be noted that the MW switch is shown as a transfer switch for the purpose of converting the line status indicator circuit from a busy-idle circuit to a message-waiting circuit without modification of the line status indicator device 40 and without the necessity of adding signaling leads between the attendant and each telephone station set.

Conclusion

Although the inventive concept of using the line voltage present from the central switching machine to operate a visual signaling device is shown with a zener diode-thyristor control circuit, it should be understood that such a control circuit can be replaced with other types of control circuits, such as, for example, a two-terminal PNPN device.

What is claimed is:

1. In a telephone arrangement where a telephone communication line is extended from a central switching machine to a plurality of physically separated locations, a plurality of idle line indicator circuits each connectable to said line at individual ones of said locations, each said idle line indicator circuit operable for providing a visual indication of the idle status of said line, and each said idle line indicator circuit comprising:

means for detecting the voltage across said communication line, said means operable when said voltage exceeds a preset value, said preset voltage value being the voltage value present when said communication line is idle; and means operable in response to the continued enabling of said detecting means for generating a pulsating voltage level, said means operable from voltage supplied over said communication line and including a light emitting source arranged to turn on and off in response to said pulsating voltage.

2. The invention set forth in claim 1 wherein said detecting means includes a voltage breakdown circuit having a breakdown voltage value higher than the voltage value present across said communication line when said communication line is busy, said breakdown voltage value being lower than the voltage value present across said communication line when said communication line is idle and said voltage breakdown circuit also having a sustaining voltage value lower than said breakdown voltage value; and said pulsating voltage generating means includes low current drain power supply means for accumulating power from said communication line to operate said light emitting source.

3. The invention set forth in claim 2 wherein said pulsating voltage level generating means includes:

a first capacitor, said capacitor arranged to become charged to the voltage level determined by the voltage level present on said communication line;

a second capacitor connected in series with said voltage breakdown circuit to form a series network, said series network being connected in parallel with said first capacitor so that when said first capacitor charges from current supplied from said communication line to a voltage value above said breakdown voltage value said voltage breakdown circuit conducts current thereby charging said second capacitor, said first capacitor thereupon becoming discharged to a value below said sustaining voltage value of said voltage breakdown circuit causing said voltage breakdown circuit to stop conducting current until such time as said first capacitor again becomes charged above said breakdown voltage value, said charging and discharging of said first capacitor continuing so long as said communication line remains idle.

4. The invention set forth in claim 3 wherein said light emitting source is connected in parallel with said second capacitor so that when said second capacitor is charged said light emitting source is turned on and so that when said voltage breakdown circuit stops conducting current said light emitting source serves to remove the charge from said second capacitor.

5. The invention set forth in claim 4 wherein said voltage breakdown circuit includes a three-terminal thyristor with the anode and cathode terminals connected between said first and second capacitors.

6. The invention set forth in claim 5 wherein said voltage breakdown circuit further comprises a zener diode connected between said first capacitor and the gate terminal of said thyristor.

7. A line status indicator circuit for use at a telephone communication line termination location to show the status of said line, said line status indicator circuit connectable at said communication line termination location across said communication line from a central switching machine, said line status indicator circuit comprising:

means for detecting the voltage across said communication line, said means operable when said voltage exceeds a preset value, said preset voltage value being the voltage value present when said communication line is idle; and means operable in response to the continued enabling of said detecting means for generating a pulsating voltage level, said means operable from voltage supplied over said communication line and including a light emitting source arranged to turn on and off in response to said pulsating voltage.

8. The invention set forth in claim 7 wherein said pulsating voltage generating means includes means for detecting the voltage polarity of said communication line, said detecting means operable for inhibiting any said generation of said pulsating voltage when said communication line voltage is reversed.

9. The invention set forth in claim 7 wherein
said detecting means includes a voltage breakdown circuit having a breakdown voltage value higher than the voltage value present across said communication line when said communication line is busy, said breakdown voltage value being lower than the voltage value present across said communication line when said communication line is idle and said voltage breakdown circuit also having a sustaining voltage value lower than said breakdown voltage value; and said pulsating voltage generating means includes low current drain power supply means for accumulating power from said communication line to operate said light emitting source.

10. The invention set forth in claim 9 wherein said pulsating voltage level generating means includes:

a first capacitor, said capacitor arranged to become charged to the voltage level determined by the voltage level present on said communication line;

a second capacitor connected in series with said voltage breakdown circuit to form a series network, said series network being connected in parallel with said first capacitor so that when said first capacitor charges from current supplied from said communication line to a voltage value above said breakdown voltage value said voltage breakdown circuit conducts current thereby causing said second capacitor to charge, said first capacitor thereupon becoming discharged to a value below said sustaining voltage value of said breakdown circuit causing said breakdown voltage circuit to stop conducting current unitl such time as said first capacitor again becomes charged above said breakdown voltage value, said charging and discharging of said first capacitor continuing so long as said communication line remains idle.

11. The invention set forth in claim 10 wherein said light emitting source is connected in parallel with said second capacitor so that when said second capacitor is charged said light emitting source is turned on and so that when said voltage breakdown circuit stops conducting current said light emitting source serves to remove the charge from said second capacitor.

12. The invention set forth in claim 11 wherein said voltage breakdown circuit includes a three-terminal thyristor with the anode and cathode terminals connected between said first and second capacitors and a zener diode connected between said first capacitor and the gate terminal of said thyristor.

13. The invention set forth in claim 11 further comprising:

a second idle line indicator circuit for use at said telephone communication line termination location to show the idle status of a second communication line, said second idle line indicator circuit connectable at said telephone communication line termination location across said second communication line from said central switching machine, said second idle line indicator circuit comprising:

a third capacitor connectable to said second communication line, said third capacitor arranged to become charged to the voltage level determined by the voltage level present on said second communication line;

a second voltage breakdown circuit having a breakdown voltage value higher than the voltage value present across said second communication line when said second communication line is busy, said breakdown voltage value being lower than the voltage value present across said second communication line when said second communication line is idle, said second breakdown circuit also having a sustaining voltage value lower than said breakdown voltage value;

a fourth capacitor connected in series with said voltage breakdown circuit to form a series network, said series network being connected in parallel with said third capacitor so that when said third capacitor charges from current supplied from said second communication line to a voltage value above said breakdown voltage value said second voltage breakdown circuit conducts current thereby causing said fourth capacitor to charge, said third capacitor thereupon becoming discharged to a value below said sustaining voltage value of said second breakdown circuit causing said second breakdown circuit to stop conducting current until such time as said third capacitor again becomes charged above said breakdown voltage value, said charging and discharging of said third capacitor continuing so long as said second communication line remains idle; and a second light emitting device connected across said fourth capacitor whereby when said fourth capacitor is charged said second light emitting device is visually on and when said fourth capacitor is discharged said second light emitting device is visually off.

14. The invention set forth in claim 13 further comprising means for cross-coupling said first and said second idle line indicator circuits at said termination location so that when both said first and said second lines are idle said first and said second light emitting devices turn on and off synchronously with each other.

15. The invention set forth in claim 14 wherein said cross-coupling means includes a fifth capacitor connected between said fourth capacitor and said first voltage breakdown circuit and a sixth capacitor connected between said second capacitor and said second voltage breakdown circuit.

16. In combination:
a telephone communication line pair extending from a switching machine, a first lead of said communication line pair having thereon negative voltage potential with respect to the voltage potential on a second lead of said communication line pair;

a line status indicator circuit connected across said pair of communication leads in a first direction with respect to said voltage potential across said pair of communication leads;

means for reversing said voltage potential across said pair of communication leads so that said first lead has thereon positive voltage potential with respect to the voltage potential on said second lead;

said line indicator circuit comprising means operable from said voltage potential supplied over said pair of communication leads for generating a pulsating voltage level, said means including a light emitting source arranged to turn on and off in response to said pulsating voltage; and means operable in response to a detected reversed voltage potential across said pair of communication leads for inhibiting said generation of said pulsating voltage level.

17. The invention set forth in claim 16 wherein said pulsating voltage generating means includes:

a voltage breakdown circuit having a breakdown voltage value and a sustaining voltage value, said breakdown voltage value being higher than said sustaining voltage value.

18. The invention set forth in claim 17 wherein said pulsating voltage generating means includes:

means for connecting said light emitting source to one terminal of said voltage breakdown circuit;

a first capacitor arranged to become charged to the voltage level determined by the voltage level present across said communication leads, said capacitor connected to another terminal of said voltage breakdown circuit so that when said first capacitor charges to a voltage value above said breakdown voltage value said voltage breakdown circuit conducts current thereby causing said light emitting source to turn on, said first capacitor thereupon becoming discharged to a value below said sustaining voltage value causing said voltage breakdown circuit to stop conducting current until such time as said first capacitor again becomes charged above said breakdown voltage value.

19. The invention set forth in claim 18 wherein said pulsating voltage generating circuit further includes a second capacitor connected in parallel with said light emitting source so that when said voltage breakdown circuit conducts current said second capacitor becomes charged.

* * * * *